(12) United States Patent
Suzuki

(10) Patent No.: US 7,733,436 B2
(45) Date of Patent: Jun. 8, 2010

(54) LIQUID CRYSTAL DISPLAY MODULE

(76) Inventor: Yuto Suzuki, c/o Funai Electric Co., Ltd., 7-1, 7-chome Nakagaito, Daito-shi, Osaka (JP) 574-0013

( * ) Notice: Subject to any disclaimer, the term of this patent is extended or adjusted under 35 U.S.C. 154(b) by 158 days.

(21) Appl. No.: 12/074,348

(22) Filed: Mar. 1, 2008

(65) Prior Publication Data

US 2008/0218660 A1   Sep. 11, 2008

(30) Foreign Application Priority Data

Mar. 6, 2007   (JP) ............................. 2007-056390

(51) Int. Cl.
*G02F 1/1333* (2006.01)
(52) U.S. Cl. ............................. 349/58; 349/65; 349/67; 362/632; 362/633; 362/634
(58) Field of Classification Search ........................ None
See application file for complete search history.

(56) References Cited

U.S. PATENT DOCUMENTS 6,879,308 B2 *  4/2005  Hsieh et al. .................... 345/87
6,954,238 B2 * 10/2005  Liu et al. ....................... 349/65
2005/0180171 A1 *  8/2005  Huang et al. ................. 362/633
2007/0047265 A1 *  3/2007  Kang et al. ................... 362/634

FOREIGN PATENT DOCUMENTS

| JP | 06-051293  | 2/1994  |
| JP | 10-097806  | 4/1998  |
| JP | 10-339868  | 12/1998 |

\* cited by examiner

*Primary Examiner*—Richard H Kim

(57) ABSTRACT

In a liquid crystal display module of edge light system, a periphery of a liquid crystal panel, a light guide plate and a reflective sheet are laid one upon another and surrounded by a case, and a lamp and a reflecting plate are disposed between an incidence surface of the light guide plate and a side of the case. A rear side of the module is not covered by the case. The reflecting plate is of a groove type that the lamp is held in the groove while an opening of the groove is opposed to the incidence surface. The case has an opening formed in a predetermined side of the case. The reflecting plate is insertable through the opening. The reflecting plate is slid from the opening while a reflecting plate bottom is in abutment against a side of the case, thereby being detachably attachable.

7 Claims, 11 Drawing Sheets

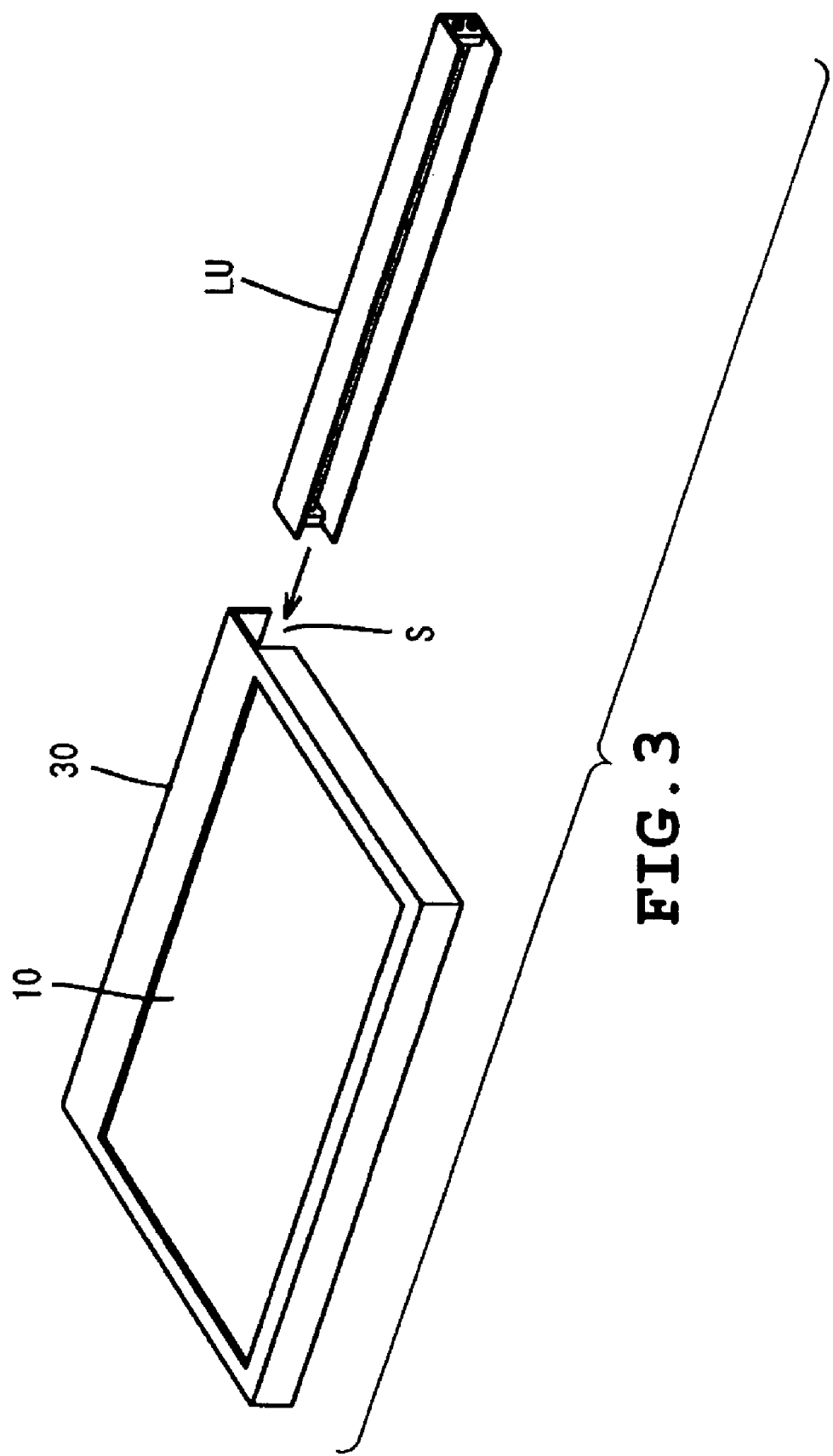

LIQUID CRYSTAL DISPLAY MODULE

CROSS-REFERENCES TO RELATED APPLICATIONS

The present application is related to the Japanese Patent Application No. 2007-056390, filed Mar. 6, 2007, the entire disclosure of which is expressly incorporated by reference herein.

BACKGROUND OF THE INVENTION

1. Field of the invention

The present invention relates to a liquid crystal display (LCD) module of the edge light system.

2. Description of the related art

Conventional LCD modules of the edge light system comprise a reflector 2 formed into a groove-shape so that a lamp with two sockets at both ends respectively is housed in the groove, as shown in FIGS. 11A and 11B. The reflector 2 is attached to a frame 3 after an opening of the groove has been aligned with an incidence surface of a light guide plate 1. A liquid crystal panel is disposed at the front side of the light guide plate 1, and a reflective sheet is disposed at the rear side of the light guide plate 1. A metal bezel having a rectangular opening is attached to the liquid crystal panel from a display surface side, thereby covering left, right, upper and lower ends of the display surface and the frame 3 side surface of the liquid crystal panel. The bezel is fastened onto the frame 3 side surface. Furthermore, the rear side of the LCD module is also covered with a plate.

Accordingly, when a lamp housed in the reflector 2 is replaced by a new one, screws are taken out so that the bezel and liquid crystal panel are detached, and then, the light guide plate 1 and reflector 2 need to be detached from the frame 3. More specifically, the LCD module needs to be completely disassembled for replacement of lamps.

The following are known techniques to cope with the aforesaid problem. JP-A-H10-339868 discloses a structure in which a reflector housing a lamp is provided with protrusions formed at a light emitting side and a light guide plate has engagement holes extending substantially perpendicularly to an incidence surface of the light guide plate. The protrusions are inserted into the respective engagement holes so that the reflector is held on the light guide plate. Furthermore, JP-A-H10-97806 and JP-A-H06-51293 each disclose structures in which a reflector is slid from a side opening of a LCD module so as to be detachably attachable.

However, the engagement holes are formed in the incidence surface of the light guide plate in the technique disclosed by JP-A-H10-339868. Accordingly, light incidence upon the light guide plate is reduced and there is a possibility that the incidence surface of the light guide plate may be damaged. In the technique disclosed by JP-A-H10-97806, the incidence surface of the light guide plate cannot be cleaned. In the technique disclosed by JP-A-H06-51293, the front of the sliding mechanism is opened and the rear of the sliding mechanism is covered by a holding case. Since such a sliding mechanism spoils the design of the module, the sliding mechanism is hidden from outside. As a result, a liquid crystal display device (LCD module) needs to be uninstalled from a base unit or apparatus in order that the incidence surface of the light guide plate may be cleaned.

BRIEF SUMMARY OF THE INVENTION

Therefore, an advantage of some aspects of the present invention is to provide an LCD module in which a lamp can easily be replaced by a new one and an incidence surface of the light guide plate can easily be cleaned.

The present invention provides a liquid crystal display module, comprising:

an edge light system in which a periphery of a liquid crystal panel, a light guide plate and a reflective sheet laid one upon another are surrounded by a case and a lamp and a reflecting plate are disposed between an incidence surface of the light guide plate and a side of the case; the case is formed so that a rear side of the liquid crystal display module is not covered by the case; the reflecting plate is of a groove type that the lamp is held in the groove while an opening of the groove is opposed to the incidence surface; the case has an opening formed in a predetermined side of the case, with the reflecting plate insertable through the opening; and the reflecting plate is slid from the opening while a bottom of the reflecting plate is in abutment against a side of the case, the reflecting plate is detachably attachable.

According to the above-described construction, the lamp cam easily be replaced by another, and the incidence surface of the light guide plate can easily be cleaned.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout:

FIG. 3 is a perspective view of the LCD module to which the lamp unit is being attached;

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, such variations and alternate embodiments are contemplated, and can be made without departing from the spirit and scope of the invention.

One embodiment of the present invention will be described in the following order:

1. Construction of LCD module;
2. Modified forms; and
3. Summary

1. Construction of LCD Module

Figure 1:
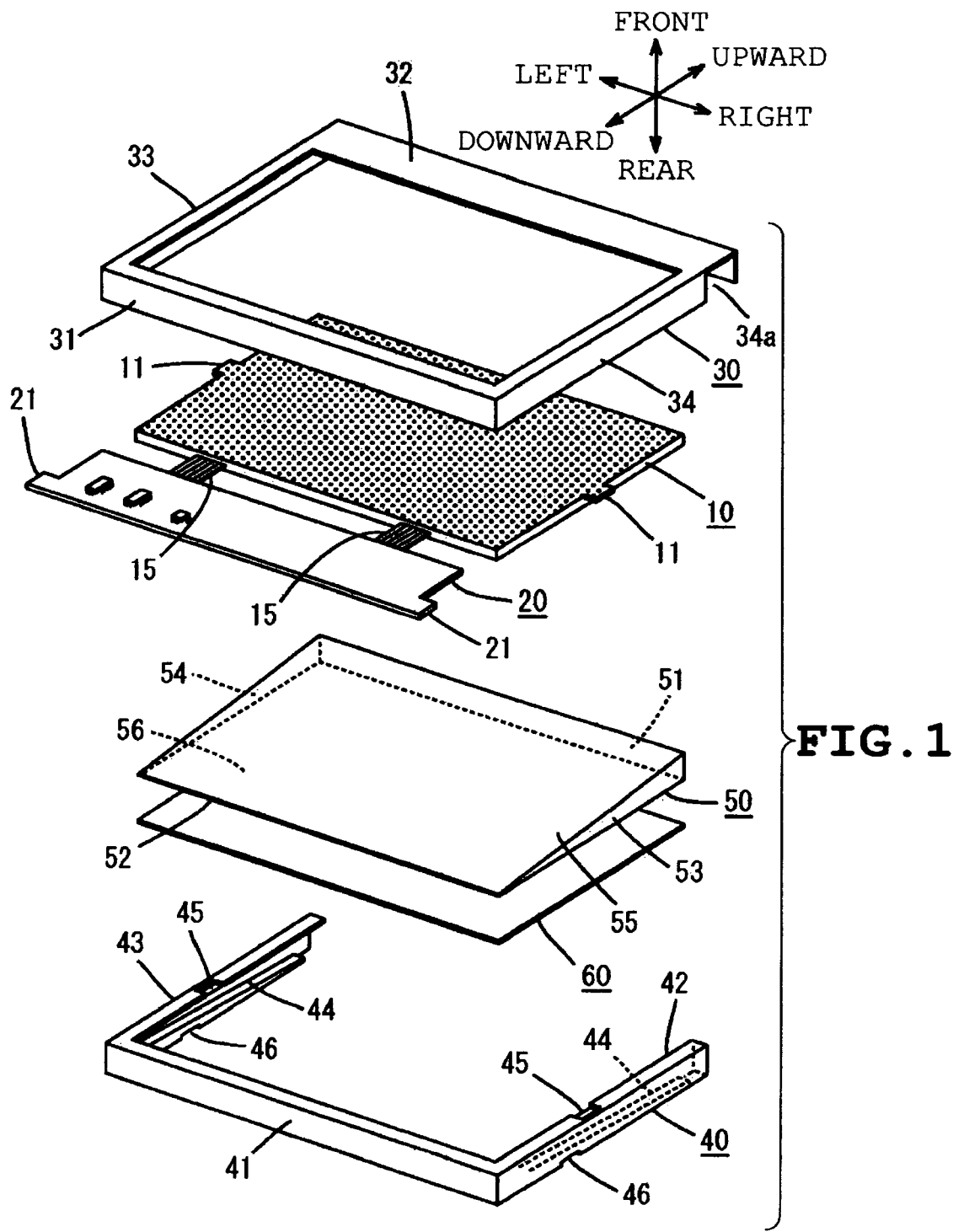
FIG. 1 is an exploded perspective view of an LCD module without a lamp unit.

FIG. 1 is an exploded perspective view of an LCD module 100 without a lamp unit LU. In the following description, a display surface side of a liquid crystal panel 10 refers to a front and a side provided with a housing S in which the lamp unit LU is accommodated refers to an upper surface.

The LCD module 100 without the lamp unit LU comprises a reflective sheet 60, a light guide plate 50 and the liquid crystal panel 10 all of which are sequentially laid one upon another inside a frame 40. A bezel 30 is fitted with the frame 40 so as to cover the latter. Thereafter, a control board 20 connected to the liquid crystal panel 10 by flat cables 15 is disposed at the rear side. The flat cables 15 are disposed between the frame 40 and the bezel 30 to connect upper and lower sides of the frame 40 to each other along a side of the frame 40.

The frame 40 is formed substantially into a C-shape and includes opposite right and left longitudinal frame portions 42 and 43 and a transverse frame portion 41 connecting lower ends of both longitudinal frame portions 42 and 43 to each other. The transverse frame portion 41 has a larger length than the longitudinal frame portions 42 and 43. Although the liquid crystal panel 10 and the reflective sheet 60 are fitted within the frame 40, the incidence surface 51 side of the light guide plate 50 protrudes slightly out of a C-shaped opening.

The light guide plate 50 has such a wedge-shaped section that an incidence surface 51 side thereof is thicker than the other part thereof and the light guide plate becomes gradually thinner and thinner toward a face 52 thereof opposite to the incidence surface. A pair of holders 44 are provided on inner sides of the frame 40 for holding the light guide plate 50. The holders 44 are inclined so that a front face 55 of the light guide plate 50 placed on the holders are substantially in parallel with a panel surface of the liquid crystal panel 10. The liquid crystal panel 10 has a pair of protrusions 11 formed on middle portions of opposite sides thereof respectively. The protrusions 11 are engaged in respective recesses 45 formed in the middle portions of the opposite sides of the frame 40. The liquid crystal panel 10 is placed on the frame 40 so as to be spaced from the front face 55 of the light guide plate 50.

The bezel 30 covering the frame 40 from the front side has a width that is substantially the same as an external dimension of the frame 40 and a height (vertical dimension) that is larger than the external dimension of the frame 40 by a space for accommodating the lamp unit LU. Sides with a predetermined width extend from upper, lower, right and left ends of the bezel 30 substantially vertically respectively. A rectangular opening is surrounded by the sides. A viewing area of the liquid crystal panel 10 is exposed from the opening. The lower side 31 is in abutment against the transverse frame portion 41 of the frame 40 with the flat cables 15 being interposed therebetween. The left side 33 is in abutment against the longitudinal frame portion 43. The right side 34 is in abutment against the longitudinal frame portion 42.

The bezel 30 is fixed to the outer side of the frame 40 by screws (not shown) entwisted into screw holes formed through the sides 31 to 33, whereby the reflective sheet 60, light guide plate 50 and liquid crystal panel 10 all laid one upon another are held within the frame 40. Thus, the frame 40 and bezel 30 constitute a case.

On the other hand, the upper side 32 of the bezel 30 is not in abutment against the frame 40, whereupon a space serving as a housing S is defined between the upper side 32 and the members laid inside the frame 40. The side 34 is formed with an opening 34a communicating with the housing S.

Figure 5:
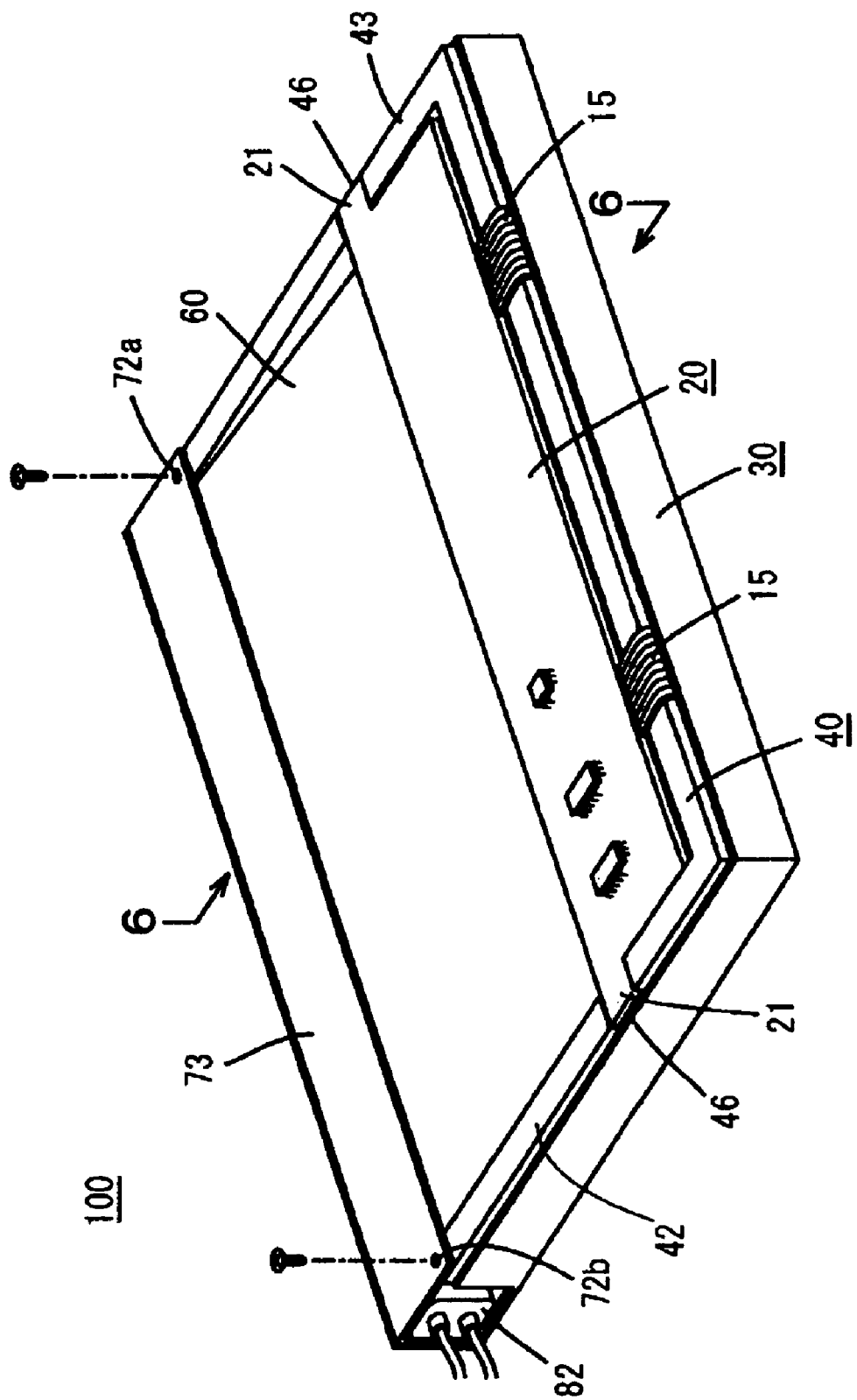
FIG. 5 is a perspective view of the LCD module as viewed from the rear.
Figure 6:
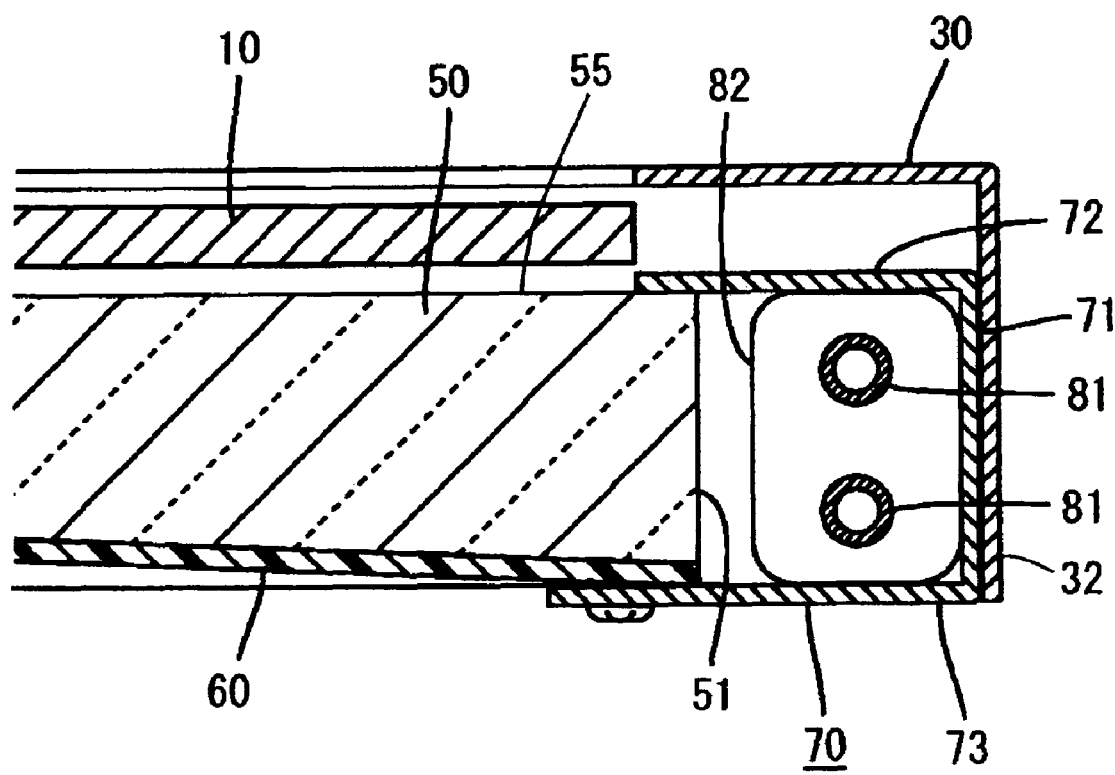
FIG. 6 is a partially sectional view taken along line 6-6 in FIG. 5.

The longitudinal frame portions 42 and 43 of the frame 40 have recesses 46 which are formed in the respective rear sides to hold the control board 20 as shown in FIG. 5. The control board 20 has protrusions 21 on opposite ends thereof. The protrusions 21 are engaged with the respective recesses 46 so that the control board 20 locked in a predetermined position at the rear side of the LCD module 100. A plate having substantially the same shape is placed on the rear of the control board 20. The control board 20 and the plate are fixed to the frame 40. The plate serves as a shield plate protecting the control board 20 physically and electromagnetically.

Figure 2:
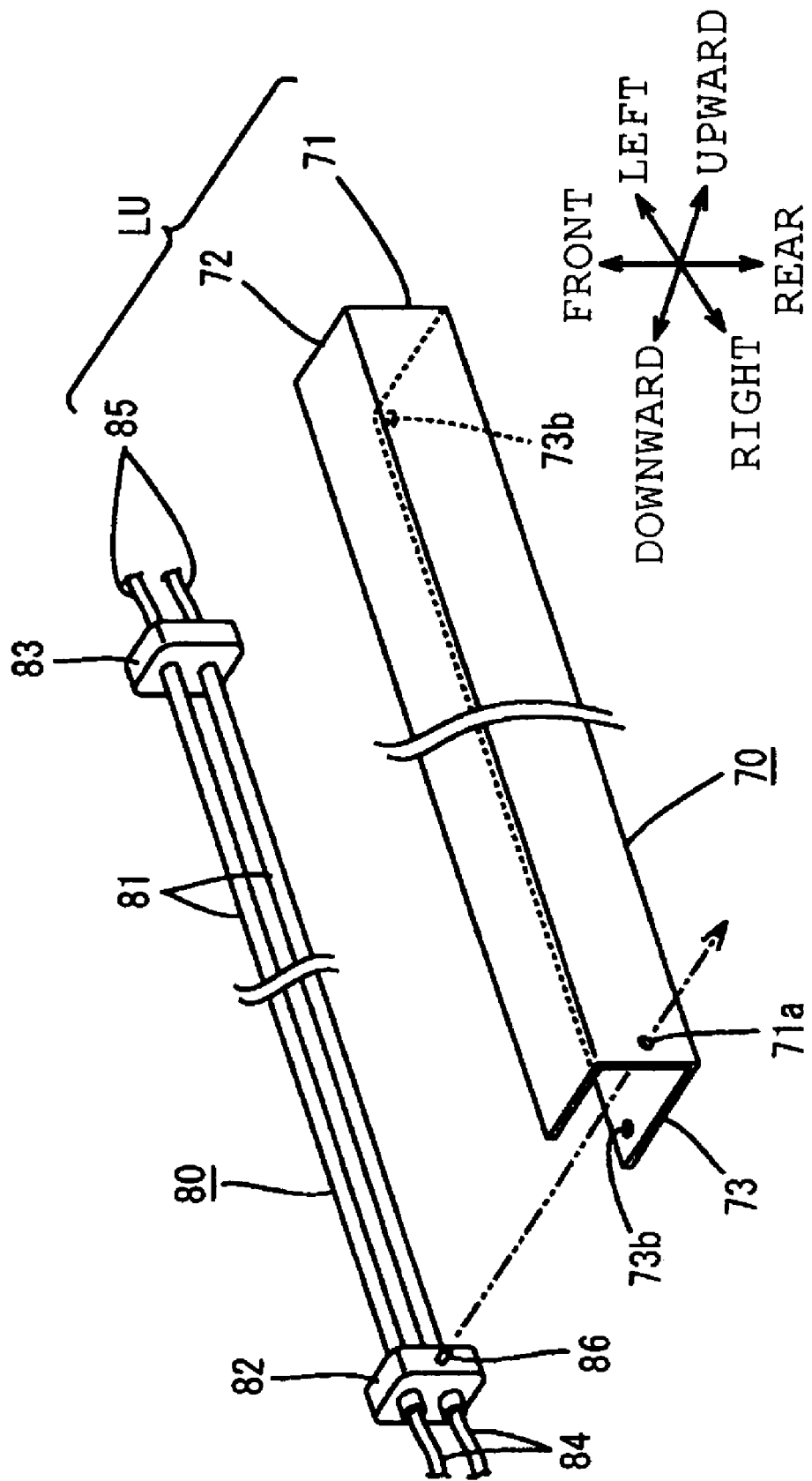
FIG. 2 is an exploded perspective view of the lamp unit.

FIG. 2 is an exploded perspective view of the lamp unit LU. The lamp unit LU comprises a lamp 80 housed therein and a reflector 70 (reflecting plate) reflecting light emitted from the lamp 80 in a predetermined direction. The reflector 70 is formed by bending a metal plate so as to have a generally C-shaped section and so as to extend right and left. More specifically, both ends of a base side are bent substantially vertically so that side plates parallel to each other are formed, whereby a groove is defined by the base side serving as a bottom plate and side plates.

The lamp 80 comprises two parallel arranged cold cathode fluorescent lamps (CCFLs) 81 coupled to each other by generally parallelepiped sockets 82 and 83 fitted with both ends of the CCFLs 81 respectively. Two leads 84 and 85 are connected to terminals of the CCFLs 81, extending out of the sockets 82 and 83 respectively. Each of the sockets 82 and 83 (holding members) has three sides closely adhered to insides of the base side 71, front side 72 and rear side 73 of the reflector 70 respectively, whereby the CCFLs 81 are held along the groove of the reflector 70.

When the lamp unit LU is to be housed in the housing S, the lead 85 at the side to be inserted initially is drawn along the outer surface of the rear side and then further drawn externally together with the other lead 84 thereby to be connected to an inverter circuit (not shown). The inverter circuit supplies an inverter voltage to the CCFLs 81 so that the CCFLs are turned on. The rear side of the liquid crystal panel 10 is irradiated with light emitted from the housed lamp unit LU while the light is reflected on the reflective sheet 60 covering a boundary of the light guide plate 50 and substantially an entire rear side of the light guide plate 50.

Figure 4A:
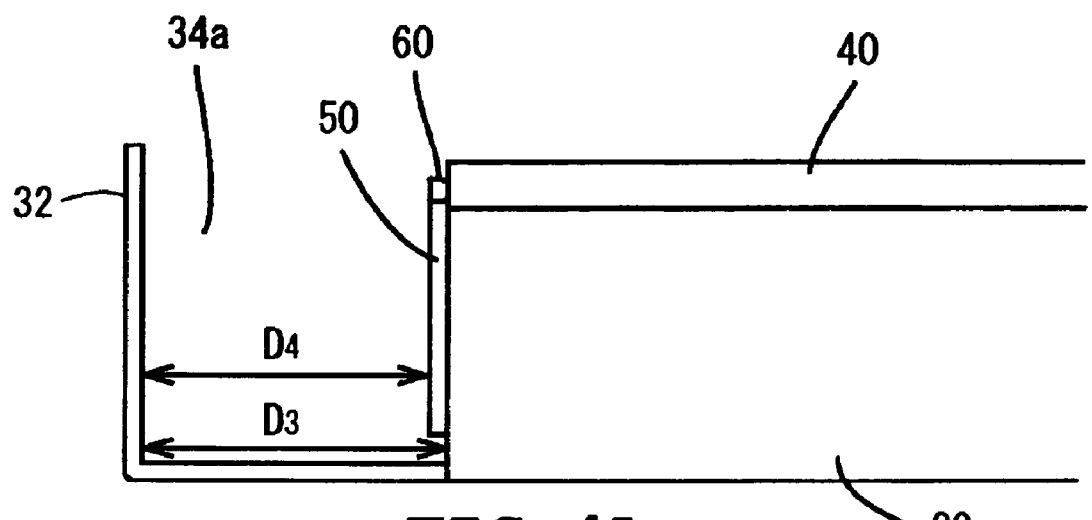
FIGS. 4A and 4B illustrate a housing and the lamp unit for comparison of the size of the lamp unit with the housing.
Figure 4B:
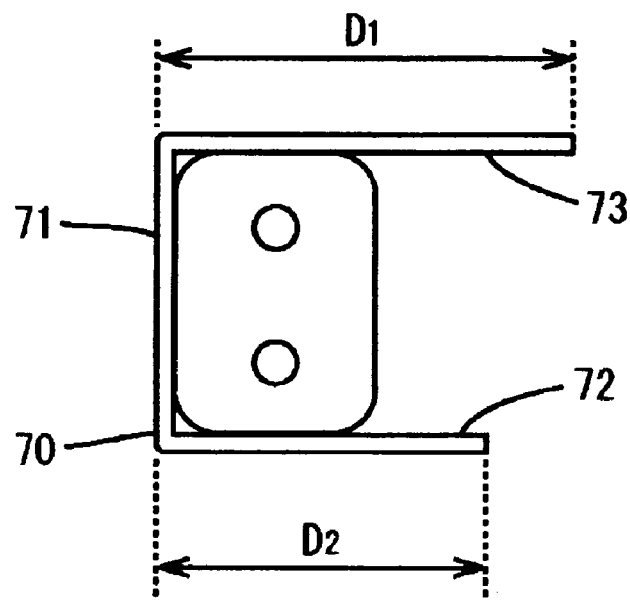

The front side 72 needs to pass through the opening 34a in order that the lamp unit LU may be housed in the housing S. FIGS. 4A and 4B illustrate the housing and the lamp unit for comparison of the size of the lamp unit with the housing. As shown in the figure, the reflector 70 is formed so that a height D2 of the front side 72 thereof is slightly smaller than a width D3 of the opening 34a. Furthermore, an end of the front side 55 of the light guide plate 50 serves as a guide along which the lamp unit LU is slid. Accordingly, the reflector 70 is formed so that the height D2 is larger than a space D4 between the incidence surface 51 of the light guide plate 50 and the upper side 32 of the bezel 30. On the other hand, since the rear side 73 of the reflector 70 passes along the rear side of the frame 40 without passing through the opening 34a, the height D2 need not be adjusted to a width D3 of the opening 34a.

The lamp unit LU constructed as described above is passed through the right opening 34a and slidingly inserted into the housing S while the front side 72, base side 71 and rear side 73 thereof are in abutment against the front 55 of the light guide plate 50, the upper side 32 of the bezel 30 and the rear side of the frame 40 respectively and the lamp unit LU is guided by the front end of the light guide plate 50. When the lamp unit LU has been housed in the housing S, the reflector 70 is fixed to the frame 40 by screwing screws into screw holes 73*b* (see FIG. 5) respectively.

When the lamp unit LU has been housed in the housing S, the socket 82 located nearer to the opening 34*a* has the protrusion 86 formed at the side in contact with the base side 71 of the reflector 70. The base side 71 is formed with the hole 71*a* engaging the protrusion 86. The protrusion 86 and hole 71*a* constitute an engagement structure used for positioning the lamp unit LU. When the protrusion 86 is engaged with the hole 71*a*, the lamp 80 can be disposed at a predetermined position in the reflector 70.

The lamp unit LU and the LCD module except the lamp unit LU are completed, and the lamp unit LU is slidingly inserted through the opening 34*a* into the housing S. More specifically, the distal end of the front side 72 of the reflector 70 is abutted against the front 55 side of the light guide plate 50 thereby to position the reflector 70 with respect to the frontward or rearward direction. The lamp unit LU is slid widthwise while being guided by the light guide plate 50, thereby being housed in the housing S so as to assume a predetermined position. The screws are inserted through 72*a* and 72*b* respectively so that the lamp unit LU is screwed to the longitudinal frame portions 42 and 43 thereby to be fixed at a predetermined position.

On the other hand, when the lamp is to be replaced by a new one, the screws are disengaged from the holes 72*a* and 72*b* and the lamp unit LU is slid sidewise through the opening 34*a*, thereby being drawn out. As a result, the lamp unit LU is detached from the LCD module 100. The CCFLs 81 are replaced by other CCFLs and the lamp unit LU is re-housed in the groove of the reflector 70 and slidingly inserted through the opening 34*a* into the housing S. After insertion, the lamp unit LU is fixed by the screws. Thus, lamp replacement can be carried out by detachment of two screws and by slide of the lamp unit LU but without detachment of an overall LCD module 100. Furthermore, when the lamp unit LU is detached out of the housing S, the incidence surface 51 of the rear side is exposed. Consequently, the incidence surface 51 can be cleaned without detachment of the whole lamp unit LU from the LCD module 100.

2. Modified Forms

The lamp unit LU may be modified as follows.

Figure 7:
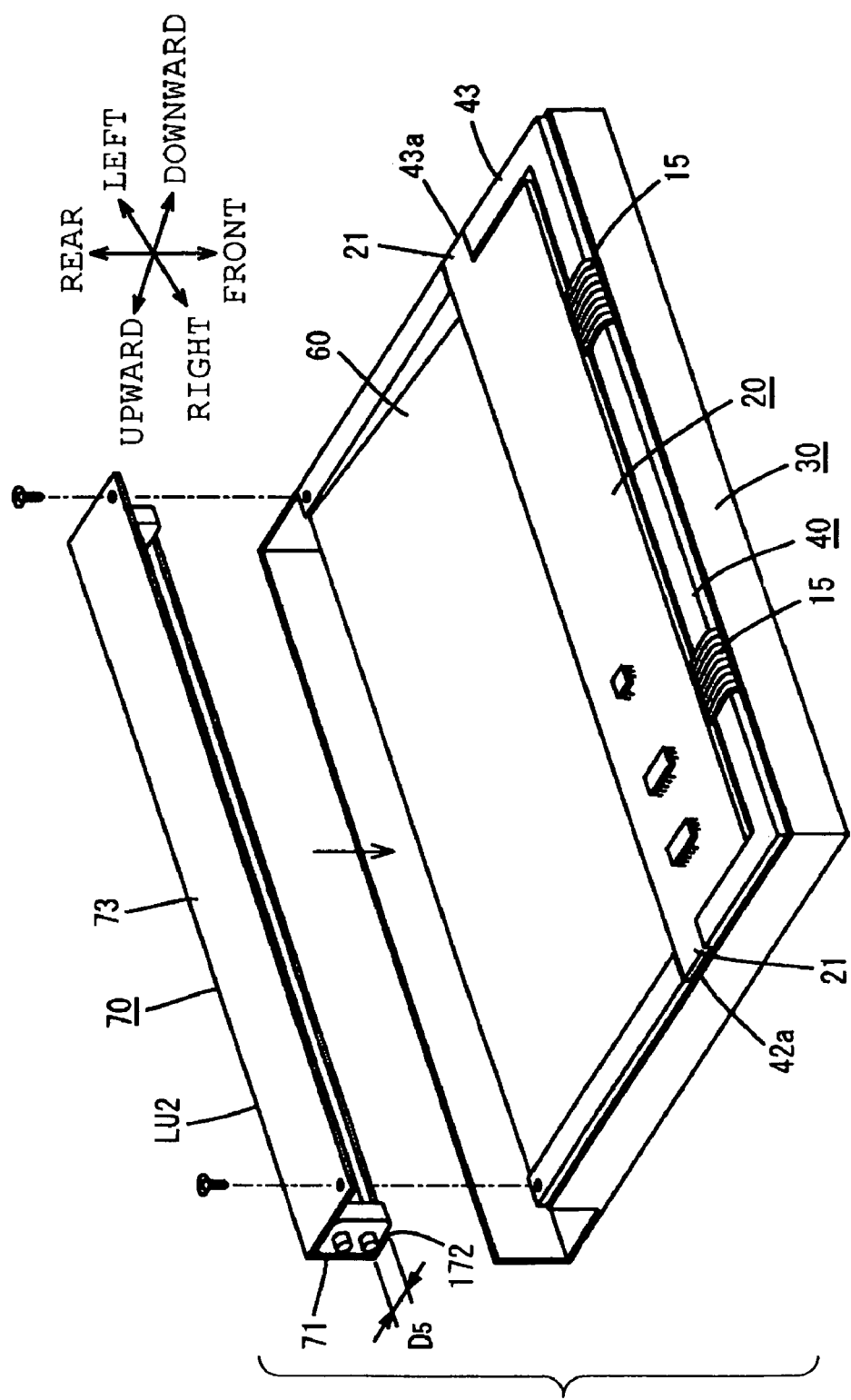
FIG. 7 is a perspective view of a first modified form.

Modified Form 1:

The front side 172 of the reflector 70 may have a vertical dimension D5 that is shorter than the vertical dimension D4 so as to be capable of passing between the light guide plate 50 and the upper side of the bezel 30, as shown in FIG. 7. Consequently, the lamp unit LU can be detachably attachable to the housing S from the rear side as well as can slidingly be inserted through the opening 34*a*. In this case, there is a possibility that the incidence surface 51 may be damaged when the lamp unit LU2 abrades the incidence surface 51. In view of the aforesaid problem, the vertical dimension of each socket 82 may be rendered larger than D5 so that contact can be avoided between the front side 172 and the incidence surface 51. The opening 34*a* may or may not be provided in this case.

Figure 8:
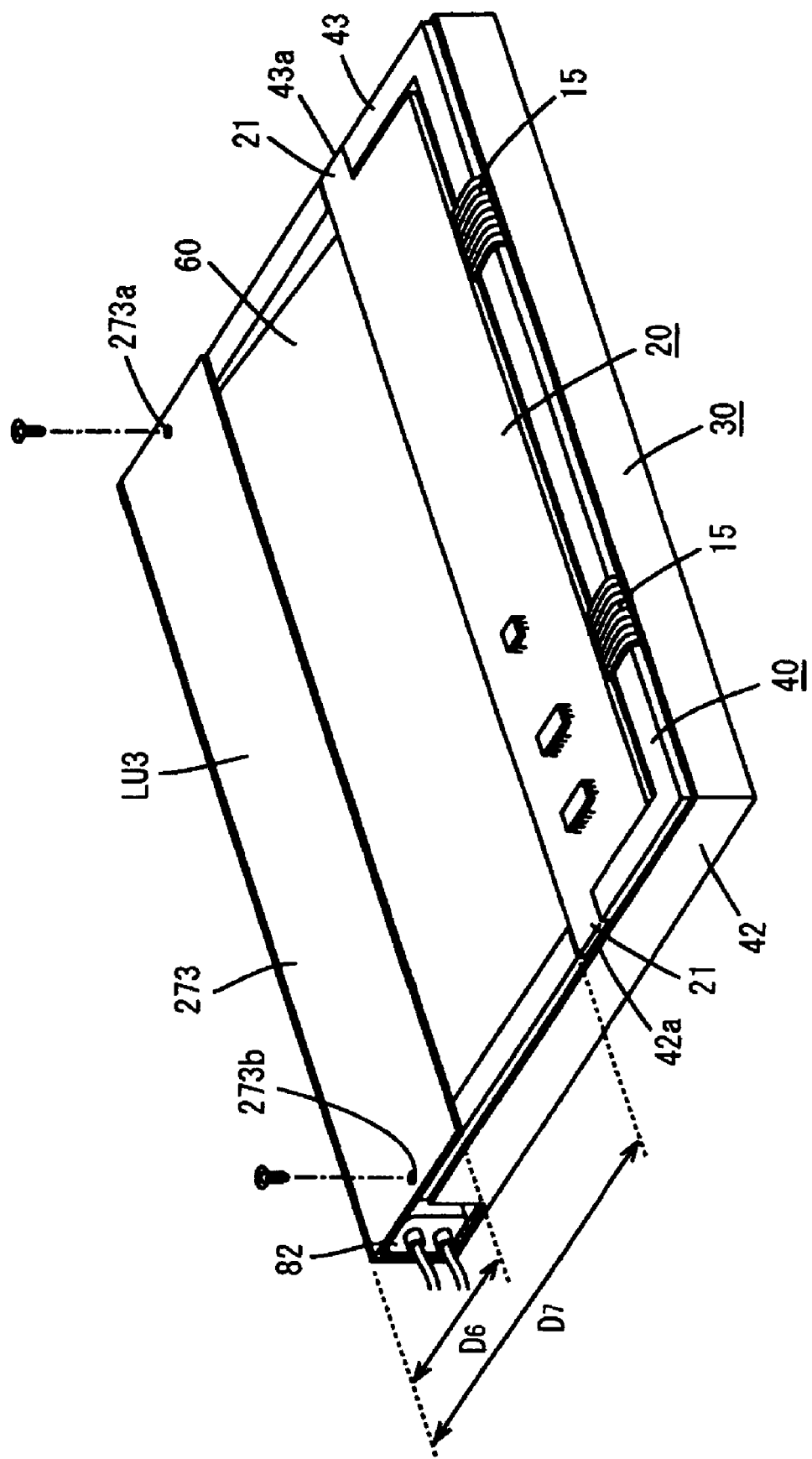
FIG. 8 is a perspective view of a second modified form.

Modified Form 2:

The rear side of the reflector 70 may be rendered longer as the rear side 273 as shown in FIG. 8. More specifically, a vertical dimension D6 of the rear side 273 may be rendered longer than the vertical dimension D1 in the foregoing embodiment so that a larger area of the rear side of the LCD module 100 is covered.

In the foregoing embodiment, the rear side is not covered by the bezel 30 and frame 40. Accordingly, the reflective sheet 60 is exposed at the rear side except for a part where the control board 20 is disposed. Although being held between the holders 44 and the light guide plate 50, the reflective sheet 60 is also held between the rear side 273 and the light guide plate 50 when the vertical dimension of the rear side 273 is rendered longer. Consequently, a fixing force of the reflective sheet 60 can be improved. The vertical dimension D6 can be increased to a max value D7 that reaches the front of the control board 20.

Figure 9:
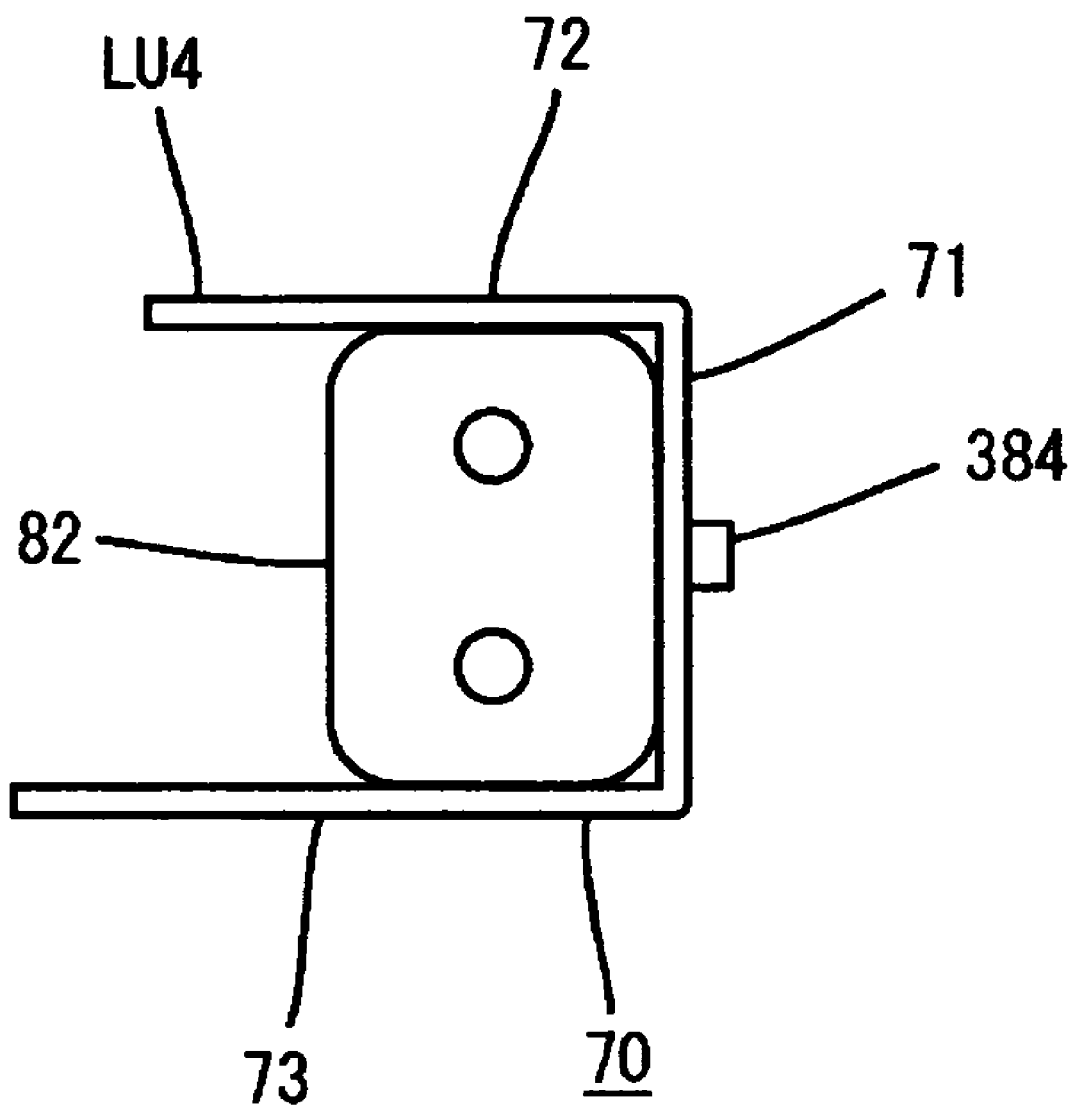
FIG. 9 is a perspective view of a third modified form.

Modified Form 3:

The protrusion 384 formed on the socket 82 may have such a length that the protrusion protrudes through the base side 71 of the reflector 70 as shown in FIG. 9. In this case, the upper side of the bezel 30 may also have a through hole with which the protrusion 384 is engageable, so that the protrusion 384 engages the hole of the bezel 30 when the lamp unit LU4 has been housed in the housing S. As the result of the construction, the protrusion 384 serves to position not only the lamp 80 relative to the reflector 70 but also the lamp unit LU4 in the housing S.

Figure 10:
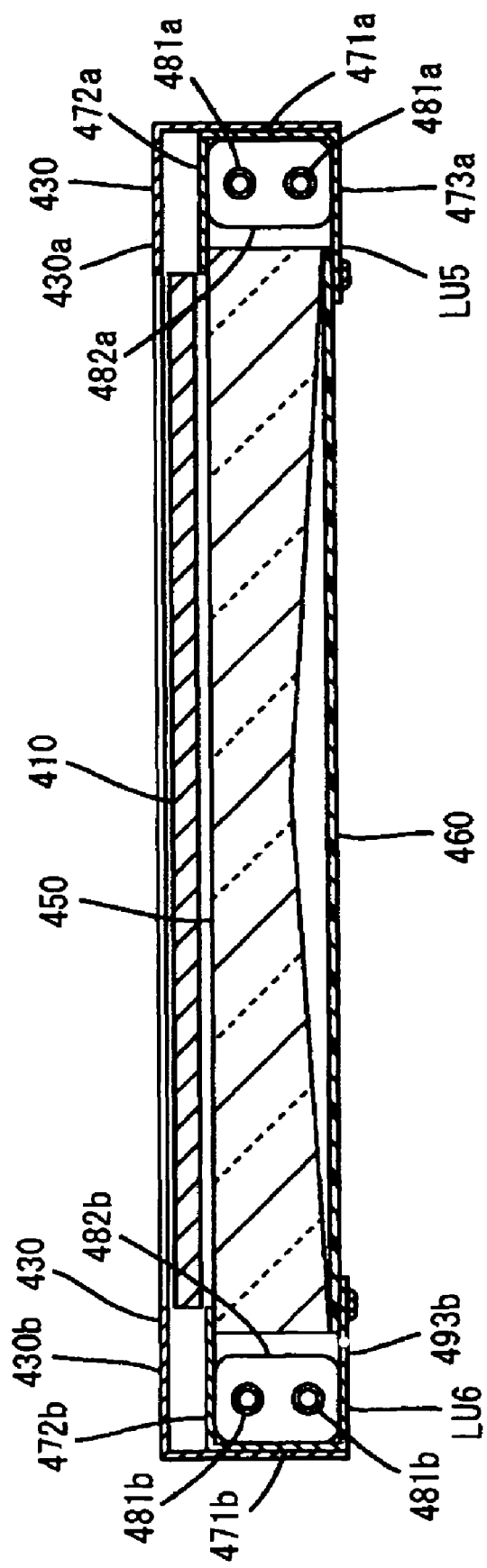
FIG. 10 is a perspective view of a fourth modified form.
Figure 11A:
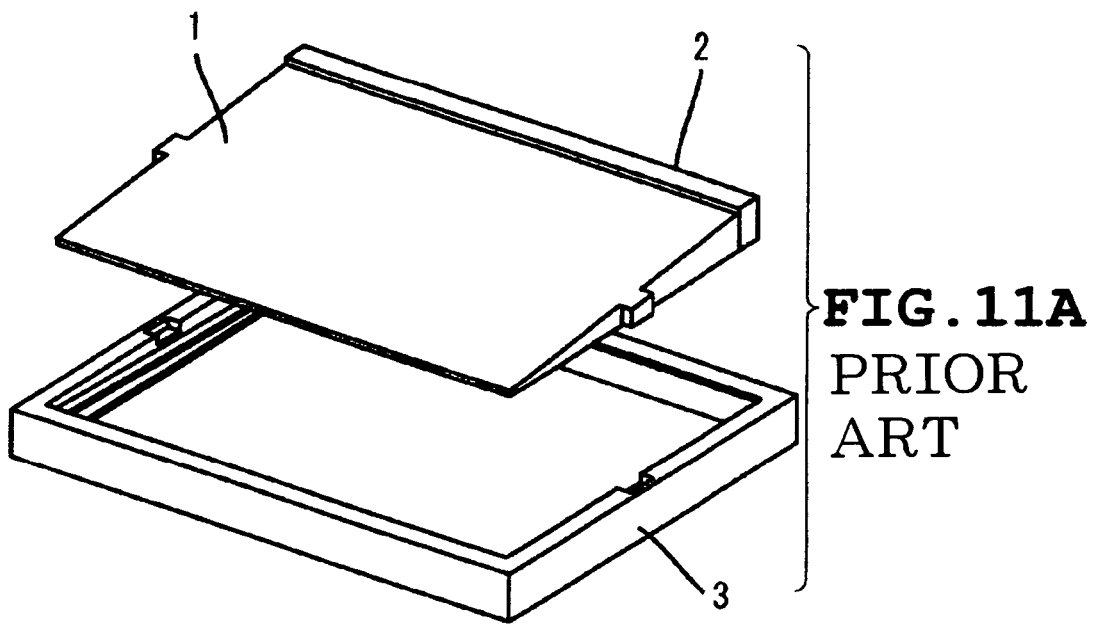
FIGS. 11A and 11B are a perspective view of a conventional LCD module.
Figure 11B:
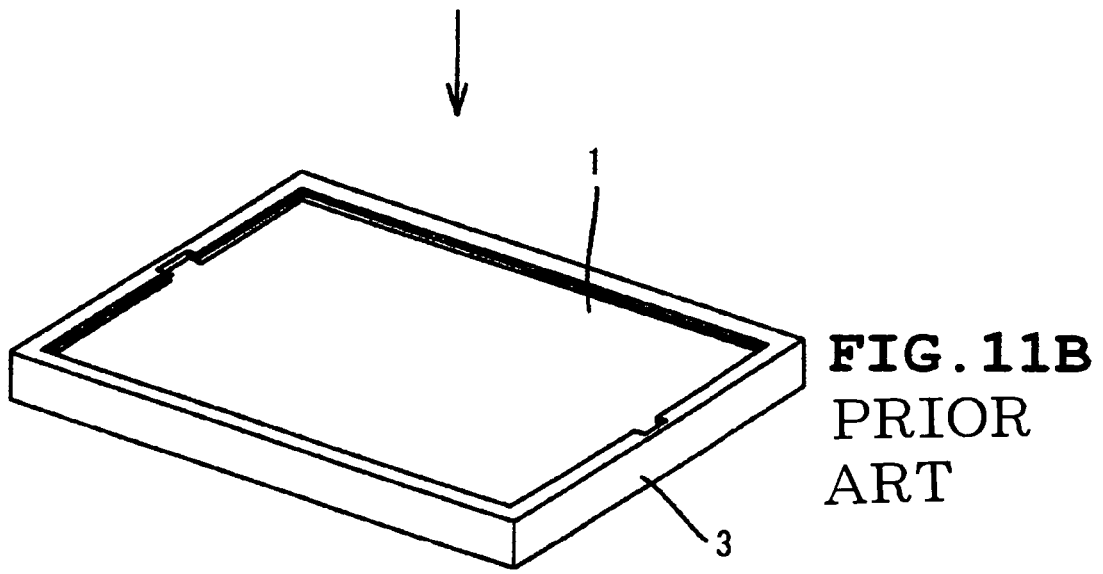

Modified Form 4:

The LCD module 100 may have two lamp units LU5 and LU6 provided at both ends thereof as shown in FIG. 10. When two lamp units are employed, the luminance of the LCD module 100 can be improved. A V-shaped light guide plate 450 is used when two lamp units are employed. The V-shaped light guide plate has a thickness that is reduced from the incidence surfaces formed on both ends of thereof toward the center thereof. Accordingly, the V-shaped light guide plate is suitable for the LCD module with two lamp units. Furthermore, the frame comprises only the longitudinal frame portions. The reflective sheet 460, V-shaped light guide plate 450 and liquid crystal panel 410 are sequentially laid one upon another on the longitudinal frame portions disposed in parallel with each other. The laid members are covered by the bezel 430 and then screwed to the frame, whereby the LCD module 100 except the lamp units LU5 and LU6.

3. Summary

The liquid crystal panel 10, light guide plate 50 and reflective sheet 60 are surrounded by the frame 40 and the bezel 30 except the display surface and the rear side. The lamp 80 and reflector 70 are disposed between the incidence surface 51 and the upper side of the bezel 30. The lamp 80 is held in the groove of the reflector 70. The reflector 70 is then inserted through the opening 31*a* formed in one side of the bezel 30. The reflector 70 can be slid from the opening 34*a* so as to be detachably attachable to housing while the base side 71 of the reflector is in abutment against the upper side of the bezel 30. Consequently, the lamp can easily be replaced by another and the incidence surface of the light guide plate can easily be cleaned in the LCD module of the edge light system.

As one embodiment, the invention provides a liquid crystal display module, comprising:

an edge light system in which a periphery of a liquid crystal panel, a light guide plate and a reflective sheet laid one upon another are surrounded by a case and a lamp and a reflecting plate are disposed between an incidence surface of the light guide plate and a side of the case; the light guide plate has a wedge-shaped section that an incidence surface of the light guide plate is thicker than an opposite surface of the incidence surface; the liquid crystal panel is disposed so as to be spaced from a front surface of the light guide plate; the reflective sheet is closely adhered to the light guide plate so as to cover substantially an overall rear surface of the light guide plate, the module further comprising: a frame, including opposite right and left longitudinal frame portions and a transverse frame portion connecting lower ends of the right and left longitudinal frame portions to each other and having a larger length than the longitudinal frame portions, the frame being formed into a C-shape, the reflective sheet, the light guide plate and the liquid crystal panel being sequentially laid one upon another inside the frame; a control board disposed at a rear surface side of the frame and connected to the liquid crystal panel by a flat cable; a bezel having a lower face abutting against the transverse frame portion of the frame with the flat cable interposed between the frame and the lower face of the bezel, a left side face abutting against the left longitudinal frame portion, a right side face abutting against the right longitudinal frame portion, and an upper face forming a housing together with the reflective sheet, the light guide plate and the liquid crystal panel sequentially laid one upon another inside the frame without abutting against the frame, the right side face formed with an opening communicating with the housing, the bezel fitted with the frame from the front side so as to cover the frame, the lamp including two cold cathode fluorescent lamps disposed in parallel to each other, and rectangular parallelepiped sockets fitted with both ends of the cold cathode fluorescent lamps respectively, the cold cathode fluorescent lamps coupled to each other and having respective terminals to which leads are connected respectively, the leads extending out of outer faces of the sockets; a reflector formed by bending a metal plate so that the reflector has a C-shaped section and further formed into a shape of a groove including a front face, a rear face both substantially in parallel to each other and a base face connecting the front and rear faces to each other, the groove extending from side to side, the sockets closely adhered to an inside of each face of the groove, with the cold cathode fluorescent lamp held by the reflector along the groove, the reflector reflecting light from the lamp in a predetermined direction; the incidence surface side of the light guide plate protrudes from a C-shaped opening of the frame in the housing; and the reflector is formed so that the front face has a height smaller than a width of the opening and longer than a space between the incidence surface of the light guide plate and the upper face of the bezel; the rear face has a height larger than the width of the opening; the reflector passing through the opening, guided by a front side end of the light guide plate while the front face is in abutment against the front face of the light guide plate; and the base face is in abutment against the upper face of the bezel and the rear face is in abutment against the rear face of the frame, thereby the reflector is slidingly inserted into the housing.

As another embodiment of the invention, the reflecting plate may be detachably attachable from the rear side of the case. According to the invention, the lamp can also be replaced by another at the rear side of the liquid crystal module.

As further another embodiment of the invention, the reflecting plate may include a rear side plate which is sized so as to cover at least a part of the rear of the reflective sheet. According to the embodiment, the reflective sheet can firmly be fixed.

As further another embodiment of the invention, the module may further comprise a holding member which holds the lamp at a predetermined position in the groove of the reflecting plate while being in abutment against at least a bottom plate of the reflecting plate, and an engagement structure locking the holding members at the predetermined position in the groove, the engagement structure being disposed between the holding member and the reflecting plate. According to the embodiment, the lamp can be attached to the reflecting plate during lamp replacement.

As further another embodiment of the invention, the engagement structure may include a protrusion formed on the holding member and a through hole formed through the bottom plate of the reflecting plate, and the protrusion protrudes through the through hole to an outer face side of the bottom plate, engaging a hole formed at a predetermined location in the case. According to the embodiment, the lamp unit can easily be mounted.

As further another embodiment of the invention, the light guide plate may have a pair of opposite sides formed with respective incidence surfaces, and two sets of the lamps and the reflecting plates may be provided on the incidence surfaces respectively. According to the embodiment, the LCD module with two lamp units can be provided.

The invention should not be limited by the foregoing embodiment. For those of ordinary skill in the art, it goes without saying that mutually replaceable members or arrangements disclosed in the embodiment can be re-combined in different modes, that members or arrangements which are not disclosed in the embodiment but belong to the related art and which are mutually replaceable with the members or arrangements disclosed in the embodiment can suitably be replaced or re-combined in different modes, and that members or arrangements which are not disclosed in the embodiment but which those of ordinary skill in the art can consider as replaceable with the members or arrangements disclosed in the embodiment can suitably be replaced or re-combined in different modes.

What is claimed is:

1. A liquid crystal display module, comprising:
    an edge light system in which a periphery of a liquid crystal panel, a light guide plate and a reflective sheet laid one upon another are surrounded by a case and a lamp and a reflecting plate are disposed between an incidence surface of the light guide plate and a side of the case;
    the light guide plate has a wedge-shaped section that an incidence surface of the light guide plate is thicker than an opposite surface of the incidence surface;
    the liquid crystal panel is disposed so as to be spaced from a front surface of the light guide plate;
    the reflective sheet is closely adhered to the light guide plate so as to cover substantially an overall rear surface of the light guide plate, the module further comprising:
    a frame, including opposite right and left longitudinal frame portions and a transverse frame portion connecting lower ends of the right and left longitudinal frame portions to each other and having a larger length than the longitudinal frame portions, the frame being formed into a C-shape, the reflective sheet, the light guide plate and the liquid crystal panel being sequentially laid one upon another inside the frame;
    a control board disposed at a rear surface side of the frame and connected to the liquid crystal panel by a flat cable;
    a bezel having a lower face abutting against the transverse frame portion of the frame with the flat cable interposed between the frame and the lower face of the bezel, a left side face abutting against the left longitudinal frame portion, a right side face abutting against the right longitudinal frame portion, and an upper face forming a housing together with the reflective sheet, the light guide plate and the liquid crystal panel sequentially laid one upon another inside the frame without abutting against the frame, the right side face formed with an opening communicating with the housing, the bezel fitted with the frame from the front side so as to cover the frame, the lamp including two cold cathode fluorescent lamps disposed in parallel to each other, and rectangular parallelepiped sockets fitted with both ends of the cold cathode fluorescent lamps respectively, the cold cathode fluorescent lamps coupled to each other and having respective terminals to which leads are connected respectively, the leads extending out of outer faces of the sockets;

a reflector formed by bending a metal plate so that the reflector has a C-shaped section and further formed into a shape of a groove including a front face, a rear face both substantially in parallel to each other and a base face connecting the front and rear faces to each other, the groove extending from side to side, the sockets closely adhered to an inside of each face of the groove, with the cold cathode fluorescent lamp held by the reflector along the groove, the reflector reflecting light from the lamp in a predetermined direction;

the incidence surface side of the light guide plate protrudes from a C-shaped opening of the frame in the housing; and the reflector is formed so that the front face has a height smaller than a width of the opening and longer than a space between the incidence surface of the light guide plate and the upper face of the bezel;

the rear face has a height larger than the width of the opening;

the reflector passing through the opening, guided by a front side end of the light guide plate while the front face is in abutment against the front face of the light guide plate; and the base face is in abutment against the upper face of the bezel and the rear face is in abutment against the rear face of the frame, thereby the reflector is slidingly inserted into the housing.

2. A liquid crystal display module, comprising:

an edge light system in which a periphery of a liquid crystal panel, a light guide plate and a reflective sheet laid one upon another are surrounded by a case and a lamp and a reflecting plate are disposed between an incidence surface of the light guide plate and a side of the case;

the case is formed so that a rear side of the liquid crystal display module is not covered by the case;

the reflecting plate is of a groove type that the lamp is held in the groove while an opening of the groove is opposed to the incidence surface;

the case has an opening formed in a predetermined side of the case, with the reflecting plate insertable through the opening; and the reflecting plate is slid from the opening while a bottom of the reflecting plate is in abutment against a side of the case, the reflecting plate is detachably attachable;

the incidence surface side of the light guide plate protrudes from a C-shaped opening of a frame in a housing; and a reflector is formed so that a front face of the reflector has a height smaller than a width of the opening and longer than a space between the incidence surface of the light guide plate and an upper face of a bezel;

a rear face of the reflector has a height larger than the width of the opening;

the reflector passing through the opening, guided by a front side end of the light guide plate while the front face of the reflector is in abutment against the front face of the light guide plate; and a base face of the reflector is in abutment against the upper face of the bezel and the rear face of the reflector is in abutment against a rear face of the frame, thereby the reflector is slidingly inserted into the housing.

3. The module according to claim 2, wherein the reflecting plate is detachably attachable from the rear side of the case.

4. The module according to claim 2, wherein the reflecting plate includes a rear side plate which is sized so as to cover at least a part of the rear of the reflective sheet.

5. The module according to claim 2, further comprising a holding member which holds the lamp at a predetermined position in the groove of the light reflecting plate while being in abutment against at least a bottom plate of the reflecting plate, and an engagement structure locking the holding members at the predetermined position in the groove, the engagement structure being disposed between the holding member and the reflecting plate.

6. The module according to claim 5, wherein the engagement structure includes a protrusion formed on the holding member and a through hole formed through the bottom plate of the reflecting plate, and the protrusion protrudes through the through hole to an outer face side of the bottom plate, engaging a hole formed at a predetermined location in the case.

7. The module according to claim 2, wherein the light guide plate has a pair of opposite sides formed with respective incidence surfaces, and two sets of the lamps and the reflecting plates are provided on the incidence surfaces respectively.

* * * * *